Patented Nov. 9, 1926.

1,606,513

UNITED STATES PATENT OFFICE.

JOHN T. CHARLESON, OF AKRON, OHIO, ASSIGNOR TO THE GOODYEAR TIRE & RUBBER COMPANY, OF AKRON, OHIO, A CORPORATION OF OHIO.

METHOD OF MAKING A FIBROUS RUBBERIZED MATERIAL.

No Drawing.     Application filed March 2, 1923. Serial No. 622,452.

My invention relates to the manufacture of rubberized fibrous material which is intended chiefly, as a substitute for leather, and which is of a tough, flexible, fibrous, porous, water-resistant nature.

The object of my invention consists in eliminating several of the steps of manufacture heretofore considered necessary for the production of material of the character in question.

Heretofore, it has been suggested that rubberized fibrous material be manufactured by mixing a quantity of beaten fibers with a quantity of rubber in solution. In carrying out this suggestion, a quantity of sulfur dioxide and of hydrogen sulfide are mixed with the rubber cement prior to the addition of the fibers. After the fibers have been thoroughly dispersed in the liquid in any suitable manner, the rubber is precipitated upon the fibers, either by the addition to the mixture of a rubber precipitant, or by the suitable control of the temperature of the mixture. After precipitation of the rubber upon the fibers, they are drained from the liquid and permitted to stand for a short period of time to permit of gellation. The gellation is caused by the interaction of the sulfur dioxide and the hydrogen sulfide with the rubber, resulting in a slow cure thereof.

After a suitable degree of gellation has been produced, the mass of rubber coated fibers is subjected to several successive treatments, starting with a bath in a solution of approximately 40% rubber precipitant and 60% rubber solvent, and ending with a bath of substantially pure rubber precipitant. The solvent and precipitant usually employed are toluol and alcohol, respectively. Before the product has had an opportunity to dry it is pressed to the desired size and shape, the drying action usually taking place simultaneously, this being known as the "wet press treatment". When the product has reached its desired form and is thoroughly dried, it may then be employed for the purpose for which it was originally intended, as the interaction of the hydrogen sulfide and sulfur dioxide will complete the cure of the rubber without further attention.

By my invention I have made possible the elimination of the successive baths, to which the product has heretofore been subjected, after completion of the gellation thereof, without impairing the product. The product is formed by the deposition of the rubber on the fibers by either of the methods previously described, and is then permitted to gel. The resulting product is then heated in any desired manner to evaporate the liquid contained therein and to dry the same, and it is afterwards pressed to the desired shape and size. This is called the "dry press treatment". The heating of the product serves to evaporate the liquid in the fibers and the rubber, which usually consists of a mixture of rubber solvent and rubber precipitant. After evaporation the liquid is recovered and separated so as to be used again. The product may then be employed for the purpose for which it was originally intended, the curing action being effected by the hydrogen sulfide and sulfur dioxide without further attention thereto.

When rubber is cured by the interaction of sulfur dioxide and hydrogen sulfide, the complete cure requires about twenty-four hours. During this interval, the product is dried and pressed to the desired size and shape, the rubber retaining its plasticity until completely cured. Thus the dried, or partially dried, and plastic rubber coatings serve to weld the fibers together at their points of contact. It is necessary that the pressing be performed within twenty-four hours from the beginning of the interaction of the sulfur dioxide and hydrogen sulfide.

With the product manufactured in accordance with the method mentioned as being heretofore suggested, considerable quantities of rubber solvent and rubber precipitant must be employed, particularly in the washing, or solvent displacing operation. A relatively large portion of these chemicals may be saved by a recovering process. However, it is impossible to eliminate losses entirely. Also, after being washed with the rubber precipitant the product must be compressed to the desired size and shape while wet, because, after being dried, it will not retain the shape and size to which it has been compressed. Moreover if dry pressed, according to former practice the tensile strength is materially lower than if it had been wet pressed.

By employing my invention, however, the washing or displacing operation is eliminated and the manufacturing steps necessary for the recovery of the chemicals employed in other phases of the manufacture are materially simplified. The losses are therefore materially reduced, and the manufacture of the product is very greatly simplified and the cost thereof reduced. This is done by the elimination of the solvent displacing process by means of the drying and dry pressing, which is materially easier, from a manufacturing standpoint, than is the wet pressing of the product.

Although I have described in detail but a single application of my invention, it will be apparent to those skilled in the art that it is not so limited, but that various minor modifications and changes may be made therein without departing from the spirit of my invention, or from the scope of the appended claims.

What I claim is:

1. The method of making a rubberized fibrous material which consists in depositing coatings of rubber on a quantity of fibers, causing the fibrous mass to gel, drying the same and shaping the resulting product.

2. A method of preparing a rubber composition which comprises precipitating rubber out of solution, removing the excess liquid, causing the mass to gel, drying the product and finally shaping the same.

3. The method of making a rubberized fibrous material which consists in mixing together a quantity of beaten fibers a quantity of rubber solution and a gelling agent, precipitating the rubber upon the fibers, straining the precipitate from the liquid, permitting the mass to gel, drying the same and finally shaping the resulting product.

4. The method of making a rubberized fibrous material which consists in mixing together a quantity of beaten fibers, a quantity of rubber solution, sulfur dioxide, and hydrogen sulfide, precipitating the rubber upon the fibers, removing the fibers, causing the fibers to segregate in a matted relationship, permitting the matted mass to gel, drying the resulting product and finally shaping the product.

5. The method of making a rubberized fibrous material which consists in associating a quantity of fibers and a quantity of rubber, precipitating the rubber upon the fibers, causing gellation of the said rubber, drying the resulting mass, and subsequently pressing it.

6. The method of making a rubberized fibrous material which consists in mixing together a quantity of fibers and a rubber solution, precipitating the rubber upon the fibers, straining the rubber coated fibers from the liquid, causing the mass to gel, drying and subsequently pressing the resulting product.

7. The method of making a rubberized fibrous material which consists in mixing together a quantity of beaten fibers a quantity of rubber solution and a gelling agent, precipitating the rubber upon the fibers, straining the mass from the liquid and permitting it to gel, drying the resulting product, and subsequently pressing it to the desired size and form.

8. The method of making a rubberized fibrous material which consists in mixing together a quantity of beaten fibers a quantity of rubber solution sulfur dioxide and hydrogen sulfide, precipitating the rubber upon the fibers, removing the fibers causing the fibers to segregate in a matted relationship, permitting the fibrous mass to gel, drying the resulting product, and subsequently pressing it to the desired size and shape.

In witness whereof, I have hereunto signed my name.

JOHN T. CHARLESON.